United States Patent

Kawakami et al.

[11] 4,267,470
[45] May 12, 1981

[54] ROTATIONAL ANGLE DETECTING APPARATUS

[75] Inventors: Kazuhiko Kawakami; Noboru Sugiura, both of Katsuta, Japan

[73] Assignee: Hitachi, Ltd., Tokyo, Japan

[21] Appl. No.: 15,651

[22] Filed: Feb. 27, 1979

[30] Foreign Application Priority Data

Mar. 1, 1978 [JP] Japan .................. 53/22121

[51] Int. Cl.$^3$ ............................................. H03K 5/26
[52] U.S. Cl. .................................. 307/515; 328/110; 328/118; 328/141; 328/147; 307/358; 307/543; 123/414
[58] Field of Search ............... 328/109, 110, 118, 133, 328/134, 140, 141, 146, 147; 307/232, 358, 237; 123/117 R

[56] References Cited

U.S. PATENT DOCUMENTS

| | | | |
|---|---|---|---|
| 3,600,688 | 8/1971 | Booth | 328/110 X |
| 3,755,745 | 8/1973 | Sapir | 328/133 |
| 3,867,702 | 2/1975 | Torpie et al. | 328/147 X |
| 3,874,349 | 4/1975 | Eitzner | 123/117 |
| 3,969,677 | 7/1976 | Woyton | 328/140 |
| 3,971,995 | 7/1976 | Eikelberger | 328/141 X |

Primary Examiner—John S. Heyman
Attorney, Agent, or Firm—Craig & Antonelli

[57] ABSTRACT

A rotational angle detecting apparatus comprises a rotary disc having first protrusions for an angle signal provided along the outer periphery of the disc and second protrusion for a reference signal arranged adjacent to the first protrusions in the thickness direction of the disc. A pick-up assembly is disposed to face the second protrusion to sense the rotationl position thereof. The sensed signal including noise components due to a magnetic coupling between the pick-up assembly and the first protrusions is subject to an integration and then applied to a level detector to generate a first pulse signal which occurs only during the integration signal being greater than a predetermined threshold level. On the other hand, a second pulse signal is produced by shaping the sensed signal. The first and second pulse signals are applied to an AND logic gate from which an output pulse is obtained in synchronism with the rotation of the disc.

9 Claims, 6 Drawing Figures

ROTATIONAL ANGLE DETECTING APPARATUS

BACKGROUND OF THE INVENTION

This invention relates to a rotational angle detecting apparatus for controlling an ignition timing of an internal combustion engine, and more particularly to an apparatus for generating pulse signals in synchronism with the rotation of a crankshaft of the internal combustion engine.

As is well known, the ignition timing of the internal combustion engine has an influence on an amount of the exhaust gas emitted and gas mileage. In order to realize an optimum ignition timing, it is conventional to use a distributor which rotates in synchronism with the internal combustion engine. The ignition timing is controlled by a centrifugal advance mechanism and a vacuum advance mechanism which are disposed in the distributor.

Since, however, both the advance mechanisms are of a mechanical control system they are inferior in precision and responsiveness. In an attempt to eliminating these disadvantages, an electronic control system has been developed. In case of the electronic control system, various detectors are required to be provided for sensing various information delivered to the control system, and one of these detectors is an apparatus for detecting the rotational angle of a crank shaft.

A conventional apparatus for the detection of the rotational angle comprises a magnetic disc with a number of protrusions formed at the outer periphery thereof and one or more pick up coils disposed in opposition to the protrusions with an appropriate spacing. The disc is mounted to rotate in synchronism with the crank shaft so that an amount of magnetic flux intersecting each of the pick up coils may change in the form of an alternating wave. As a result, an amount of the rotational angle can be sensed as the number of pulses obtained by shaping the alternating signal of the pick-up coil.

Another type of a conventional detector consists of a rotary disc having a number of apertures provided along the periphery thereof and a photoelectric transducer which is disposed to face the disc so as to produce an alternating signal changing in accordance with the rotation of the disc.

The rotational angle detector is usually required to generate two kinds of pulses. One is an angle signal which is to be generated at each time the crank shaft is rotated by an amount of a certain angle. This angle is determined by the number of the protrusions disposed at equal intervals along the outer periphery of the rotary disc. The other is a reference signal which is provided in correspondence with the number of cylinders of the engine. For example, in case of a 4-cycle 6 cylinder engine, a reference signal must be generated at an angular interval of 120° in a revolution. For the control of the ignition timing, these two kinds of pulses must be generated in synchronism with each other. To this end, first protrusion for the generation of the angle signal and second protrusions for the reference signal have been formed on the same disc. In this case, however, the first and second protrusions should be located at a considerable distance in the thickness direction of the rotary disc, i.e., the axial direction of the crank shaft. Otherwise, a relatively high level of noise will be superposed on the reference signal because of an undesirable magnetic coupling between the pick-up coil for the reference signal and the angle signal-generating protrusion. Therefore a reference signal detector circuit at the succeeding stage will operate erroneously. However, a cooling fan, an air cooling compressor, an air pump for purifying the exhaust gas and the like are coupled to a pulley which is directly coupled with the crank shaft. Due to restriction of the mounting space of these components, it has been very difficult to dispose both the protrusions for the reference signal and those for the angle signal at a considerable distance in the thickness direction of the rotary disc.

The conventional detector has another drawback as follows. It is desirable from the viewpoint of high accuracy of the angle detection to provide as many protrusions as possible at the outer periphery of the disc thereby producing the angle signal of a high frequency. Due to the restriction of the mounting space in the vicinity of the crank shaft, however, the rotary disc is also restricted in its diameter. Therefore, it has been difficult to increase the number of the protrusions of the disc and thus the detection precision has been inferior.

SUMMARY OF THE INVENTION

A primary object of the present invention resides in providing a rotational angle detecting apparatus in which a reference signal can be detected without receiving any influence due to noise components even when protrusions for the reference signal are disposed adjacent to protrusions for the angle signal.

Another object of the present invention resides in providing a rotational angle detecting apparatus wherein a high frequency of an angle signal can be obtained without increasing the number of protrusions for the angle signal.

According to one aspect of the present invention, a reference signal sensed by means of a pick-up coil is applied to both an integration circuit and a waveform shaping circuit. With the integration circuit, the signal is subject to an integration and the resultant signal is applied to a level detector which produces a pulse occurring when the level of the resultant signal is higher than a predetermined threshold level. On the other hand, the waveform shaping circuit produces a pulse signal occuring when the pick-up reference signal is, for example, positive in its polarity. Both the pulses thus obtained are then applied to an AND logic circuit to generate a logical product signal.

According to another aspect of the present invention, circuit means are provided to detect a peak value in time of the output of the integration circuit, and the peak value is used to vary the threshold level in order to eliminate noise components more effectively.

According to another further aspect of the present invention, a pair of pick-up coils are disposed for the detection of the angle signal at such interval that respective picked-up signals are different in their phase by a predetermined angle, and the signals thus obtained are applied to a logic circuit to produce an angle pulse of a higher frequency than that of each picked-up signal.

Other objects, aspects and advantages of the present invention will become more apparent from the following detailed description which is real in conjunction with the accompanying drawings.

DETAILED DESCRIPTION OF THE PREFERRED EMBODIMENTS

Figure 1:
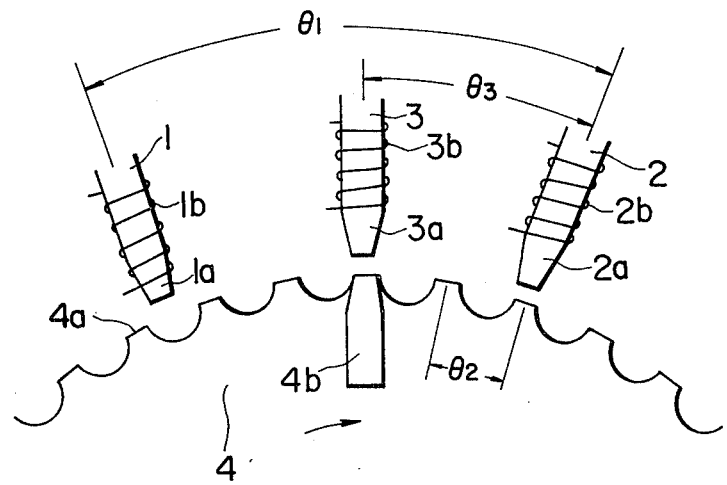
FIG. 1 shows angular position relation of pick-up coil assemblies for the angle signal with those for the reference signal with respect to protrusions of a rotary disc.
Figure 2:
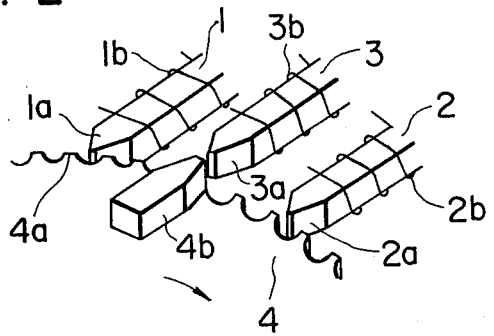
FIG. 2 is a perspective view of a part of FIG. 1.

Referring now to FIG. 1 and FIG. 2, a first magnetic pick-up assembly 1 comprising a stator 1a and a pick-up coil 1b and a second magnetic pick-up assembly 2 including a stator 2a and a pick-up coil 2b are installed at an angular interval of $\theta_1$. A third magnetic pick-up assembly 3 comprising a stator 3a and a pick-up coil 3b is installed between the first and second magnetic pick-up assemblies 1 and 2 and spaced apart from the second pick-up assembly 2 by an angle of $\theta_3$. A rotary disc 4 has protrusions 4a which are disposed at an equal angular interval of $\theta_2$ along the outer periphery of the disc 4. These protrusions 4a are used for producing the angle signal in corporation with the first and second magnetic pick-up assemblies 1 and 2. A protrusion 4b used for generating the reference signal in corporation with the third pick-up assembly 3 is stacked in the thickness direction of the disc 4 with the protrusions 4a. The first and second stators 1a and 2a are disposed on the same plane so that edge portions of the stators 1a, 2a can face the protrusions 4a with a small gap as the disc 4 rotates. On the other hand, the third stator 3a is installed on a different plane from that mentioned above so that an edge portion of the stator 3a can be opposed only to the protrusion 4b as the disc 4 rotates. An angular interval $\theta_1$ between the first and second stators is set such that when the first stator 1a is just faced with one of the protrusions 4a, the second stator 2a is shifted from the other one of the protrusions 4a by an angle of $\theta_2/4$ or $3\theta_2/4$. As the disc 4 rotates in the direction of an arrow, the first and second pick-up coils 1b and 2b produce alternating voltages, one of which has a cyclic period of an angle $\theta_2$ and is shifted in its phase by an angle of $\theta_2/4$ from the other. Although a single protrusion 4b is illustrated in FIG. 1 and FIG. 2 for producing the reference signal, a plurality of the protrusions 4b of this kind may be installed in an actual detecting device. For example, in the case of a 4-cycle 6 cylinder engine, three protrusions 4b are disposed at equal angular interval of 120° along the periphery of the disc 4 so that three reference signals each having a negative and a positive peak can be obtained therefrom in a revolution of the disc. Waveforms of the signals developed across the pick-up coils 1b, 2b and 3b are illustrated at $V_{k1}$, $V_{k2}$ and $V_s$ in FIG. 5 respectively. In this figure, a rotational angle $\theta_1$ corresponds to the angular interval $\theta_1$ between the first stator 1a and the second stator 2a as shown in FIG. 1. Likewise, a rotational angle $\theta_3$ corresponds to the angular spacing between the second stator 2a and the third stator 3a as shown at $\theta_3$ in FIG. 1. As can be seen from FIG. 5, the alternating voltage $V_{k1}$ across the first pick-up coil 1b has a waveform whose period corresponds to the angular interval $\theta_2$ of the protrusions 4a of the periphery of the disc 4. The alternating output voltage $V_{k2}$ generated across the second pick-up coil 2b has a phase difference of $\theta_2/4$ from $V_{k1}$. Since the third stator 3a is disposed to face only to the protrusion 4b, the pick-up assembly 3 produces the voltage having the positive and the negative peaks in one revolution of the disc 4. Besides, since it is disposed adjacent to the protrusions 4a, noise components as indicated at $V_n$ are contained in the voltage $V_s$. The noise voltage $V_n$ is attributed to an undesired electro-magnetic coupling between the protrusions 4a and the magnetic pick-up assembly 3, and hence its period corresponds to the angular interval $\theta_2$.

Figure 3:
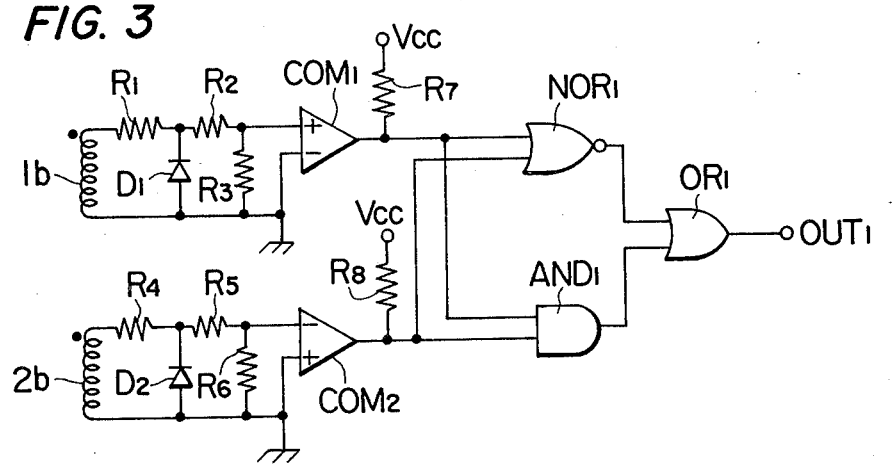
FIG. 3 is a circuit diagram showing an angle signal detection circuit according to an embodiment of the present invention.

Next, the description will be made of a signal detection circuit which produces both the angle pulse and the reference pulse from the picked up signals $V_{k1}$, $V_{k2}$ and $V_s$, referring to FIG. 3 and FIG. 4. The detection circuit according to the present invention comprises a angle signal detection circuit shown in FIG. 3 and a reference signal detection circuit shown in FIG. 4.

One end of the first pick-up coil 1b is connected to earth or a common potential line while the other end is connected through resistors $R_1$ and $R_2$ to a positive input terminal of a comparator $COM_1$. A diode $D_1$ is inserted between the juncture part of the resistors $R_1$ and $R_2$ and the earth. The diode $D_1$ is poled to prevent a negative going signal from being applied to the positive terminal of the comparator $COM_1$. A resistor $R_3$ is connected across the positive input terminal of the comparator $COM_1$ and the earth. A negative terminal of the comparator $COM_1$ is grounded. Likewise, the second pick-up coil 2b is connected at its one end to earth and at the other end to a negative input terminal of a comparator $COM_2$ through resistors $R_4$ and $R_5$.

Connected between the earth and the juncture part of the resistor $R_4$ with the resistor $R_5$ is a diode $D_2$ which is poled to prevent a negative-going signal from being applied to the negative terminal of the comparator $COM_2$. A positive terminal of the comparator $COM_2$ is connected to earth. A resistor $R_6$ is connected across the two terminals of the comparator $COM_2$. Output terminals of the comparators $COM_1$ and $COM_2$ are applied with a D.C voltage $V_{cc}$ through resistors $R_7$ and $R_8$ respectively. A NOR logic gate $NOR_1$ and an AND logic gate $AND_1$ are respectively provided to receive the outputs from the comparators $COM_1$ and $COM_2$ and to deliver their outputs to an OR logic gate $OR_1$. An output signal $OUT_1$ of the OR logic gate $OR_1$ is used as an angle pulse.

Figure 4:
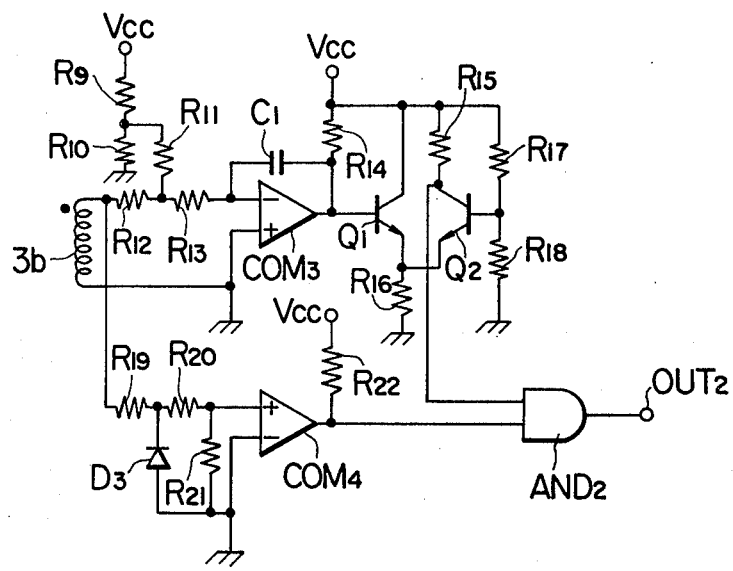
FIG. 4 is a circuit diagram showing a reference signal detection circuit according to an embodiment of the present invention.

In the reference signal detection circuit shown in FIG. 4, the third pick-up coil 3b is connected at its one end to ground or a common potential line and at the other end both to a negative terminal of a comparator $COM_3$ through resistors $R_{12}$ and $R_{13}$ and to a positive terminal of a comparator $COM_4$ through resistors $R_{19}$ and $R_{20}$ respectively. The D.C voltage $V_{cc}$ is divided by means of resistors $R_9$ and $R_{10}$ and the resultant voltage is applied through a resistor $R_{11}$ to the juncture part between the resistors $R_{12}$ and $R_{13}$. Connected across the negative input terminal and an output terminal of the comparator $COM_3$ is a capacitor C which functions in cooperation with the resistor $R_{13}$ as an integration circuit. A positive input terminal of the comparator $COM_3$ is connected to ground. The D.C voltage $V_{cc}$ is applied through a load resistor $R_{14}$ to the output terminal of the comparator $COM_3$. A pair of transistors $Q_1$ and $Q_2$ are provided to produce a pulse which occurs only during the output of the comparator $COM_3$ being greater in level than a predetermined threshold value. The transistor $Q_1$ has a base connected to the comparator $COM_3$, an emitter connected through a resistor $R_{16}$ to ground, and a collector connected to the D.C voltage source $V_{cc}$. This voltage $V_{cc}$ is divided by means of resistors $R_{17}$ and $R_{18}$ and the resultant voltage is applied to a base of the transistor $Q_2$. An emitter of the transistor $Q_2$ is connected in common with the emitter of the transistor $Q_1$ while a collector is connected through a load resistor $R_{15}$ to the D.C voltage source $V_{cc}$. A diode $D_3$ is provided to prevent a negative-going voltage from being applied to the positive terminal of the comparator $COM_4$. Across the positive and negative input terminals of the comparator $COM_4$, a resistor $R_{21}$ is connected. The D.C voltage $V_{cc}$ is applied through a resistor $R_{22}$ to an output terminal of the comparator $COM_4$. The output of the comparator $COM_4$ is applied together with the output of the transistor $Q_2$ to an AND logic gate $AND_2$ to produce a reference signal at its output terminal $OUT_2$.

Figure 5:
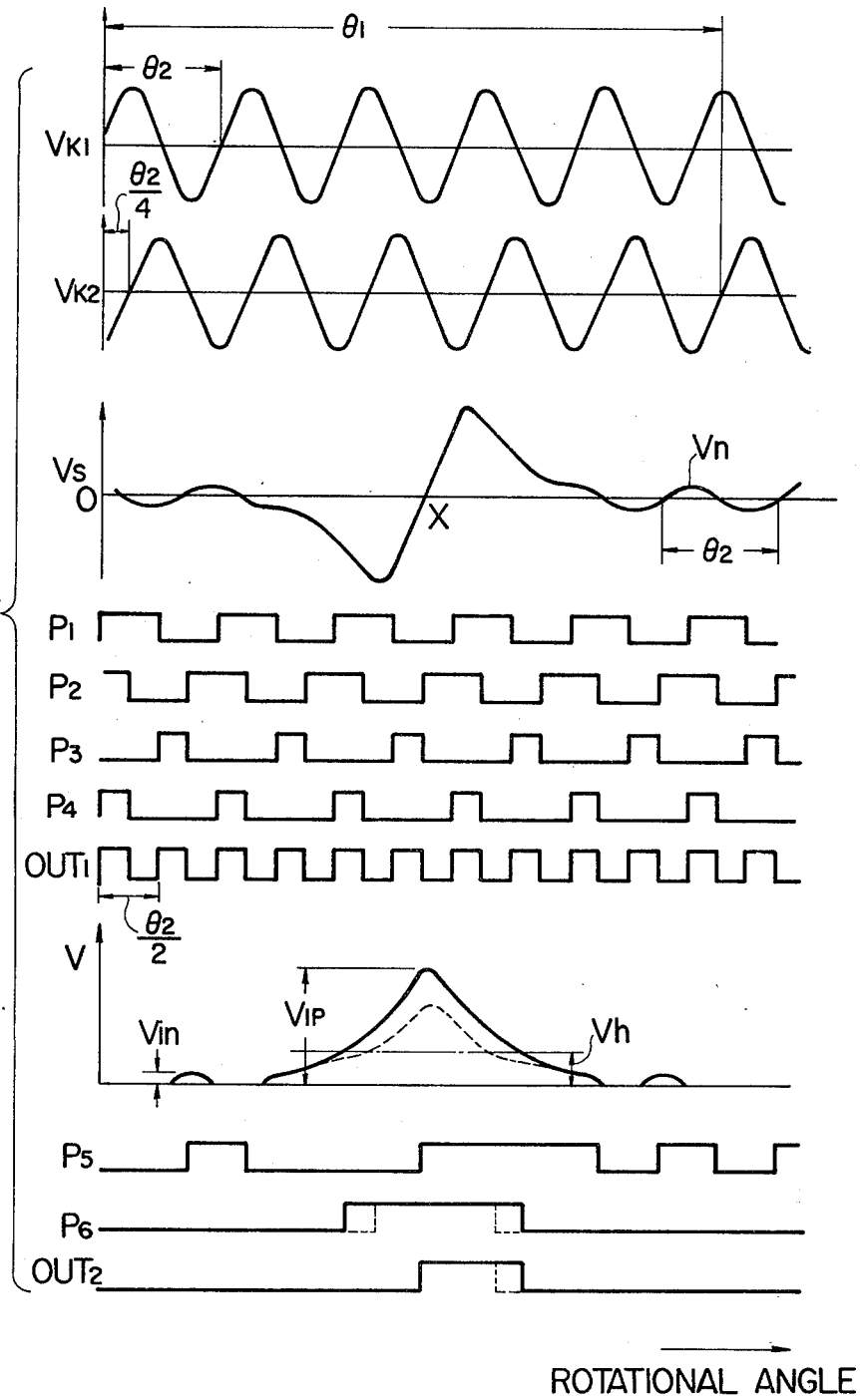
FIG. 5 shows waveforms of various signals appearing at various portions of the detection circuits illustrated in FIG. 3 and FIG. 4.

Operation of the angle signal detection circuit will be described with reference to FIG. 5. Since there is the phase difference of $\theta_2/4$ between the alternating voltage $V_{k1}$ of the first pick-up coil 1b and the alternating voltage $V_{k2}$ of the second pick-up coil 2b, waveforms of both the picked-up voltage are illustrated at $V_{k1}$, $V_{k2}$ in FIG. 5 respectively. During a positive half cycle of the picked-up voltage $V_{k1}$, the positive input terminal of the comparator $COM_1$ is given the positive voltage, therefore its output becomes logical "1" or high level. On the other hand, when the voltage of negative half cycle is developed across the first pick-up coil 1b, the voltage is led to ground and a slightly negative voltage is applied to the positive terminal of the comparator $COM_1$. Thus, the output of the comparator $COM_1$ becomes a logical "0" or a low level during the negative half cycle of the picked-up voltage $V_{k1}$. As a result, a pulse train shown at $P_1$ in FIG. 5 can be obtained from the output of the comparator $COM_1$. As mentioned before the diode $D_1$ functions to prevent the negative going voltage greater than a predetermined value from being applied to the positive terminal of the comparator $COM_1$. This value is set to $-0.4$ volts for example. When the forward voltage drop of the diode $D_1$ is supposed to be e.g. 0.7 volts and the values of the resistors $R_2$ and $R_3$ are made equal, the voltage to the positive input terminal of the comparator $COM_1$ becomes $-0.35$ volts. It does not exceed the prescribed voltage of $-0.4$ volts, therefore no problem arises. It will become a problem if a positive voltage greater than the supply D.C voltage $V_{cc}$ is applied to the positive input terminal of the comparator $COM_1$. Therefore, in order to prevent the alternating voltage of the first pick-up coil 1b from exceeding this value, the signal sensor is designed to generate about 3 volts at the maximum number of engine revolutions, for example at 6000 r.p.m, and the supply voltage is set at about 5 volts. Since the polarity of the input terminal of the comparator $COM_2$ is made opposite to that of the input terminal of the comparator $COM_1$, the logic level of its output becomes inverse to the polarity of the alternating voltage input. Accordingly, the output of the comparator $COM_2$ becomes as shown at $P_2$ in FIG. 5. By taking the NOR logic between the outputs $P_1$ and $P_2$, a signal $P_3$ appears at the output of the NOR logic gate $NOR_1$, and by taking the AND logic between the outputs $P_1$ and $P_2$, a signal as shown at $P_4$ appears at the output of the AND logic gate $AND_1$. By taking the OR logic between the signals $P_3$ and $P_4$, a signal as shown at $OUT_1$ is provided at the output terminal of the OR logic gate $OR_1$. The period of this angle signal becomes half the period of the alternating voltage $V_{k1}$ developed across the first pick-up coil 1b. This means the angle signal obtained has a frequency double that of the picked-up signal.

Now, operation of the reference signal detection circuit will be explained with reference to the waveform of FIG. 5. The alternating voltage of the third pick-up coil 3b is shown at $V_s$. This voltage has its negative and positive peaks at the left and right of a point X. The point X agrees with the position at which the third stator 3a shown in FIG. 1 is just faced to the reference signal protrusion 4b. During the negative half cycle of the voltage $V_s$, the negative voltage is applied to the negative input terminal of the comparator $COM_3$ through the resistor $R_{13}$, so that the positive voltage appears at the output terminal of the comparator $COM_3$. Hence, the capacitor $C_1$ is charged up from the power source $V_{cc}$ through the resistor $R_{14}$. When the alternating voltage $V_s$ changes from its negative polarity to positive polarity, the output voltage of the comparator $COM_3$ decreases gradually so as to decrease the stored charges of the capacitor $C_1$. And it becomes 0 volts when the charges stored have been completely discharged.

When the alternating voltage $V_s$ changes from its positive polarity to negative polarity, the output voltage of the comparator $COM_3$ gradually increases since a charging current flows from the power source $V_{cc}$ through the resistor $R_{14}$ to the capacitor $C_1$. The rise time is determined by the values of the resistors $R_{12}$, $R_{13}$, $R_{14}$ and the capacitor $C_1$ as well as the alternating voltage $V_s$. As a result, the comparator $COM_3$ produces the output as shown at V in FIG. 5. It is noted that the peak value $V_{1p}$ of the output terminal voltage of the comparator $COM_3$ becomes much greater than the peak values of the alternating voltages $V_s$ at the left and right of the point X, while the peak $V_{1n}$ corresponding to noise components does not become much higher than $V_n$. This is because the peaks $V_{1s}$ and $V_{1n}$ are given as a result of the integration of the waveform shown at $V_s$. The application of the supply voltage $V_{cc}$ to the input terminal of the comparator $COM_3$, as shown in FIG. 4, is greatly advantageous from the following viewpoint. When the disc stops, that is, when the output voltage of the third pick-up coil 3b is 0 volts, the negative input terminal of the comparator $COM_3$ is forcibly applied with a positive voltage of several millivolts which is determined by the supply voltage $V_{cc}$ and resistors $R_9$ and $R_{10}$. Accordingly the output terminal of the comparator $COM_3$ is forced to be at 0 volt, even if an offset voltage of the comparator $COM_3$ fluctuates in the positive and negative polarities. In other words, by applying a voltage greater than the offset voltage ot the negtive input terminal at the time the comparator $COM_3$ is forcibly clamped to 0 volts. This eliminates an integration error due to fluctuations of the offset voltage.

A pair of transistors $Q_1$ and $Q_2$ function as a level detector which detects whether the output voltage of the comparator $COM_3$ is over the prescribed threshold level $V_h$ and produces an output pulse which occurs only during the period that the output voltage V is over the lvel $V_h$.

More specifically, the base-emitter forwrd volage drops of the transistors $Q_1$ and $Q_2$ are supposed to be 0.7 volts. The base potential of the transistor $Q_2$ is set at 1.4 vols by means of the resistors $R_{17}$ and $R_{18}$. The resistor $R_{15}$ is selected to have a value much greater than that of the resistor $R_{16}$. Then, when the integration voltage V is below 0.7 volts, the transistor $Q_1$ is turned off and the transistor $Q_2$ turned on, so that the collector of the transistor $Q_2$ becomes approximately at 0 potential. When the integrtion voltage V becomes greater than 0.7 volts, a base current flows through the transistor $Q_1$ so that a current decided by an amplification factor flows through the resistor $R_{16}$. Since the transistor $Q_1$ is of the emitter follower connection, a voltage of substantially the same shape as that of the integration voltage V is developed across the resistor $R_{16}$. Due to this voltage across the resistor $R_{16}$, the transistor $Q_2$ is abruptly turned off, and the voltage as indicated at $P_6$ in FIG. 5 is generated at the collector of the transistor $Q_2$. As is well known, the sensitivity of the magnetic pick-up coil is influenced by an eddy current and the influence increases with the rotational speed of the disc 4. As a result, the peak $V_{1p}$ decreases as indicatedby a dotted line with the increase in the rotational speed of the disc 4. Since the predetermined threshold level $V_h$ is constant, the pulse width of the collector output voltage $P_6$ of the transistor $Q_2$ becomes narrow as indicated by a dotted line at $P_6$ in FIG. 5. For this reason, when the rise timing of the output voltage $P_6$ is utilized as an operating point for the ignition control of lthe internal combustion engine, unfavorable time lag occurs at high speed rotation. Likewise, when the falling timing of the pulse $P_6$ is utilized for the same purpose, an undesired phase lead occurs at high speed of the rotary disc 4. In order to eliminate the above-mentioned drawbacks, the point X of the alternating voltage $V_s$ should be detected for producing the reference signal. To this end, the present invention provides a further comparator $COM_4$ to which the picked-up voltage $V_s$ from the third coil 3b is applied. Since the negative part of the picked-up voltage $V_s$ is led to earth by way of the diode $D_3$, only the positive part of the voltage $V_s$ is applied to the positive input terminal of the comparator $COM_4$. Therefore this comparator $COM_4$ produces an output pulse as indicated at $P_5$ in FIG. 5. To eliminate the noise components $V_n$, an AND logic gate $AND_2$ is provided which produces an output signal as shown at $OUT_2$ in FIG. 5 by taking an AND logic between the pulses $P_5$ and $P_6$. According to this invention, the output pulse $OUT_2$ of the AND logic gate is used as the reference signal. As can be seen from the waveform of the pulse $OUT_2$, the rising timing thereof is not affected even if the peak of the alternating voltage V shifts as indicated by the dotted line. That is, a reference signal can be obtained in accurate synchronism with the rotation of the disc without receiving any influence of noise due to the undesired magnetic coupling.

Another embodiment of the reference signal detection circuit will be explained with reference to FIG. 6.

In the detection circuit shown in FIG. 4, the reference signal can be obtained only when the number of revolutions of the rotary disc is greater than the predetermined value. This is because the peak of the integration voltage V will not reach the threshold level $V_h$ if the disc rotates at a considrably low speed. The threshold level $V_h$ can not be, of course, lower than the peak $V_{1n}$ of the noise components. In order to eliminate this drawback, the embodiment of FIG. 6 is aimed at changing the level of the threshold $V_h$ in accordance with the peak value $V_{1p}$ of the integration voltage V.

Figure 6:
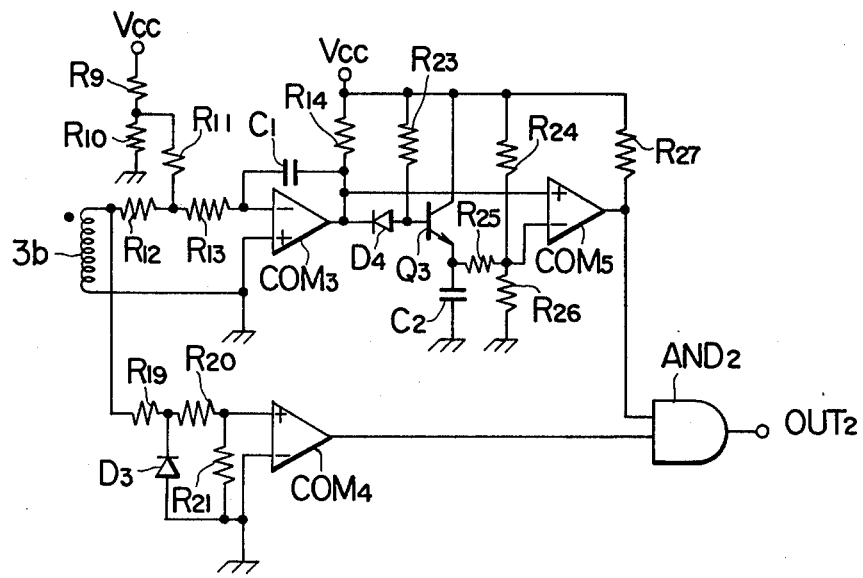
FIG. 6 is a diagram of reference signal detection circuit according to another embodiment of the present invention.

Referring to FIG. 6 in which the same symbols indicate the same elements as in FIG. 4, the output of the comparator $COM_3$ is connected through a diode $D_4$ to the base of the transistor $Q_3$. The diode $D_4$ is poled such that the positive output voltage of the comparator $COM_3$ is prevented to pass from the output terminal thereof to the base of the transistor $Q_3$. The supply voltage $V_{cc}$ is applied directly to the collector through a resistor $Q_{23}$ to the base of the transistor $Q_3$ respectively. The emitter of the transistor $Q_3$ is connected through a capacitor $C_2$ to ground. An output of the transistor $Q_3$ is delivered from its emitter and applied through a resistor $R_{25}$ to a negative input terminal of the comparator $COM_5$. The voltage $V_{cc}$ is divided by means of resistors $R_{24}$ and $R_{26}$, and the resultant voltage is also applied to the negative terminal of the comparator $COM_5$. On the other hand, the positive terminal of the comparator $COM_5$ is applied with the output from the comparator $COM_3$. An output terminal of the comparator $COM_5$ is supplied with the voltage $V_{cc}$ through a resistor $R_{29}$. The AND logic gate $AND_2$ is provided to produce a reference signal by taking an AND logic between two outputs of the comparator $COM_4$ and $COM_5$.

When the disc rotates at a considerably low speed, the comparator $COM_3$ produces the integration voltage having a relatively low peak $V_{1p}$. A potential at the base of the transistor $Q_2$ increases with the output voltage of the comparator $COM_3$. Because of the diode $D_4$ connected between the comparator $COM_3$ and the transistor $Q_2$, the base potential of the transistor $Q_2$ can not be over the output voltage of the comparator $COM_3$, if the forward voltage drop across the diode is neglected. Accordingly the base potential of the transistor $Q_2$ follows the potential at the output terminal of the comparator $COM_3$. If the peak $V_{1p}$ of the output voltage V is relatively low, then the transistor $Q_2$ becomes less conductive and a low voltage is charged across the capacitor $C_2$. The voltage across the capacitor $C_2$ is divided by means of the resistor $R_{25}$ and $R_{26}$. The voltage thus divided is applied to the negative input terminal of the comparator $COM_5$. The comparator $COM_5$ generates an output pulse which occurs only when the input voltage to the positive input terminal is over the voltage to the netative input terminal. Thus, the threshold level $V_h$ for the generation of the reference pulse is set to a relatively low level at a low rotational speed of the rotary disc 4.

On the other hand, when the disc rotates at a considerably high speed, the comparator $COM_3$ generates the integration voltage V having a relatively high peak $V_{1p}$. Thus the base of the transistor $Q_2$ becomes at a high potential so that the transistor $Q_2$ becomes more conductive. As a result, the capacitor $C_2$ is charged up to develop thereacross large voltage corresponding to the peak $V_{1p}$ of the integration voltage V.

The voltage across the capacitor $C_2$ is applied to the comparator $COM_5$ to determine the threshold level $V_h$. According to the embodiment of FIG. 6, therefore, the threshold level $V_h$ increases as the number of the revolutions of the rotary disc increases. This results in the following advantages. One is that although the noise components $V_n$ increases as the rotating speed of the disc becomes fast, these noises can be effectively eliminated. The other is that even when the disc rotates at a relatively low speed, the reference pulse can be generated in synchronism with the rotation of the disc.

When the capacitor $C_2$ is not charged up at all, the threshold level $V_h$ of the comparator $COM_5$ is determined by means of the divider circuit comprising the resistors $R_{24}$ and $R_{26}$. That is, the supply voltage $V_{cc}$ is divided by the resistors $R_{24}$ and $R_{26}$ and the resultant voltage is applied to the comparator $COM_5$ so that the negative input terminal thereof is held at a constant voltage. This voltage is desirable to be slightly greater in level than the integration noise peak $V_{1n}$ for the following reasons. At the time when the disc is about to rotate, the protrusion 4b is not necessarily positioned to face the third stator 3, therefore only the noise components $V_n$ will occur for a while at the beginning of the rotation. If at this moment, no voltage is applied to the negative input terminal of the comparator $COM_5$ from the voltage supply, the threshold level $V_h$ of the comparator $COM_5$ will be determined by the integration peak $V_{1n}$ of the noise components $V_n$. This will cause undesirable pulses to the generated at the output of the comparator $COM_5$. However, according to the embodiment of FIG. 6, the comparator $COM_5$ is given the predetermined voltage to establish the appropriate threshold level $V_h$ at the starting time of the rotation, any undesirable pulses are not produced.

Although the present invention has been described referring to specific embodiments, a variety of changes or modifications can be made without departing from the essential of the present invention. By way of example, while the magnetic pick-up assembly 3 is illustrated to position between the pick-up assemblies 1 and 2 for the angle signal, this assembly 3 can be disposed at an arbitrary position adjacent to the rotary disc 4. Any type of differential amplifiers may be used as the comparators $COM_1 \sim COM_5$. Further, a pair of transistors $Q_1$ and $Q_2$ are employed in FIG. 4 to detect whether the output of the comparator $COM_3$ is over the predetermined level, other electronic circuits such as a comparator can be employed therefor. Although specific embodiments of the present invention have been shown as employing NPN transistors connected in a particular way, it will be understood to those skilled in the art that any transistor may be replaced by an opposite conductivity type transistor with appropriate modification in the wiring connections.

We claim:

1. A rotational angle detecting apparatus comprising:
   (a) a rotary disc having at least one protrusion provided at the periphery of the disc;
   (b) a pick-up assembly for sensing a rotating position of the protrusion to produce an alternating signal in synchronism with the rotation of the disc;
   (c) an integration circuit for producing an integration of the alternating signal with time;
   (d) a level detector for sensing the integration signal thus obtained above a predetermined threshold level to produce a first rectangular wave signal occuring when the integration signal is over in level the predetermined threshold level;
   (e) a polarity detector for sensing one of positive and negative polarities of the alternating signal to produce a second rectangular wave signal occuring when the alternating voltage is in the sensed polarity; and
   (f) a logic circuit coupled to both the level detector and the polarity detector to receive the first and second rectangular wave signals for producing an AND logic signal therebetween.

2. A rotational angle detecting apparatus for controlling an internal combustion engine, comprising;
   (a) a rotary disc mounted on a crank shaft of the internal combustion engine to rotate in synchhronism therewith;
   (b) first protrusions provided along anouter pehiphery of the disc with equally spaced relationship;
   (c) second protrusion provided adjacent to the first protrusions in the thickness direction of the rotary disc at its periphery;
   (d) first pick-up assembly for sensing a rotational position of the first protrusions to produce a first alternating voltage in accordance with the rotation of the disc;
   (e) second pick-up assembly for sensing a rotational position of said second protrusion to produce a second alternating voltage in synchronism with the rotation of the disc;
   (f) an integration circuit for producing an integration of the second alternating signal with time, the second alternating signal including noise components due to a magnetic coupling between the first protrusions and the second pick-up assembly;
   (g) a level detector for sensing the integration signal obtained over a threshold level which is determined to be greater than said noise components to produce a first rectangular wave signal occuring only when the integration signal is over in level the threshold level;
   (h) a waveform shaping circuit for producing a second rectangular wave signal by shaping the second alternating signal;
   (i) circuit means coupled to receive the first and second rectangular wave signals for producing a signal which occurs only when both the first and second rectangular wave signals are received at the same time.

3. A rotational angle dectecting apparatus as defined in claim 2, wherein the first pick-up assemblies are arranged such that when one of the first pick-up assemblies is positioned to just face one of the first protrusions, the other one of the first pick-up assemblies is positioned to face with a predetermined phase difference to the other one of the first protrusions.

4. A rotational angle detecting apparatus as defined in claim 3, which further comprises first circuit means for shaping a first alternating voltage sensed by one of the first pick-up assemblies to produce a first pulse having the same phase as the first alternating voltage, second circuit means for shaping a second alternating voltage sensed by the other one of the first pick-up assemblies to produce a second pulse having a phase inverted relation with the second alternating voltage, first logic circuit for taking NOR logic between the first and second pulses, second logic circuit for taking AND logic between the first and second pulses and third logic circuit for taking OR logic between both the outputs of the first and second logic circuits to produce a rotational angle detection signal.

5. A rotational angle detecting apparatus as defined in claim 1, in which the integration circuit comprises a comparator having first and second input terminals and an output terminal, a signal sensed by the pick-up assembly being applied across the two input terminals, capacitor means connected between the first input terminal and the output terminal of the comparator and a circuit means for applying a predetermined D.C voltage to the first input terminal of the comparator.

6. A rotational angle detecting apparatus as defined in claim 1 or 2, in which the level detector comprises a pair of transistors, one of the transistors having a base to which an output of the integration circuit is applied, an emitter connected in common with an emitter of the other transistor and a collector to which a D.C voltage is applied and the other transistor having a base to which a predetermined bias potential is applied, a collector connected through a load to a supply of the D.C voltage.

7. A rotational angle detecting apparatus comprising:
(a) a rotary disc having at least one protrusion provided at the periphery of the disc;
(b) a pick-up assembly for sensing a rotating position of the portrusion to produce an alternating signal in synchronism with the rotation of the disc;
(c) an integration circuit for producing an integration of the alternating signal with time;
(d) a circuit means connected with the integration circuit for detecting a peak value of an output signal of the integration circuit;
(e) a divider circuit means for dividing the peak value to produce a reference voltage;
(f) a comparator means connected to receive the reference voltage and the output of the integration circuit for generating a pulse signal which occurs when the output of the integration circuit is greater in level than the reference voltage;
(g) a waveform shaping circuit for producing a pulse signal by shaping the alternating signal sensed by the pick-up assembly; and
(h) a logic circuit means coupled to receive the pulse signals from the comparator means and the waveform shaping circuit means for producing an output signal which occurs only when both the pulse signals are received at the same time.

8. A rotational angle detecting apparatus as defined in claim 7, in which said circuit means for producing a peak value of the integration output comprises a transistor having a base, an emitter and a collector, a diode connected between the output of the integration circuit and the base of the transistor in such a direction that a potential at the base changes in response to the output of the comparator, and a capacitor connected across the emitter of the transistor and a common potential line.

9. A rotational angle detecting apparatus as defined in claim 8, wherein said comparator means has first input terminal to receive the output of the integration circuit and second input terminal to receive the reference voltage, and which further comprises a circuit means for applying a predetermined D.C voltage to the second input terminal of the comparator means.

* * * * *